(12) United States Patent
Larue

(10) Patent No.: US 6,557,443 B1
(45) Date of Patent: May 6, 2003

(54) BAR FEEDER FOR MACHINING CENTER

(76) Inventor: Mark C. Larue, 850 County Rd. 177, Leander, TX (US) 78641

( * ) Notice: Subject to any disclaimer, the term of this patent is extended or adjusted under 35 U.S.C. 154(b) by 4 days.

(21) Appl. No.: 09/657,927

(22) Filed: Sep. 8, 2000

Related U.S. Application Data

(60) Provisional application No. 60/153,280, filed on Sep. 9, 1999.

(51) Int. Cl.[7] .............................. B23B 1/00; B23B 13/00
(52) U.S. Cl. ............................. 82/1.11; 82/124; 82/118; 82/127
(58) Field of Search ..................... 82/1.11, 118, 120, 82/121, 124, 125, 126, 127, 133, 129, 122, 165; 279/114; 269/21

(56) References Cited

U.S. PATENT DOCUMENTS

| | | | |
|---|---|---|---|
| 4,321,845 A | * 3/1982 | Szabo et al. | 82/127 |
| 5,111,562 A | 5/1992 | Burka | |
| 5,165,313 A | * 11/1992 | Karr | 82/127 |
| 5,700,117 A | 12/1997 | Sella | |
| 5,897,275 A | 4/1999 | Sella | |
| 5,899,445 A | * 5/1999 | Kimble | 269/21 |
| 5,988,960 A | 11/1999 | Hasler | |
| 6,055,892 A | 5/2000 | Otake | |
| 6,095,506 A | * 8/2000 | Schmalz et al. | 269/21 |

* cited by examiner

Primary Examiner—Henry W. H. Tsai
(74) Attorney, Agent, or Firm—James L. Jackson; Andrews & Kurth, LLP

(57) ABSTRACT

A bar stock feeder and support mechanism for an automated machining center having a control system and a method for operation thereof. A work positioning structure is removably mounted to a work support and positioning table of an automated machining center and has a bar feeder top plate. Mechanized machine controlled pneumatic bar stock chucks on the bar feeder top plate have bar stock gripping collets which are closed and opened by the control system of the automated machining center for selectively gripping the bar stock during machining and selectively releasing the bar stock to permit its movement by a bar puller which raises the bar stock to a programmed height. A control umbilical cable is connected with the control system of the automated machining center and has controlling connection with each of the bar stock chucks. During operation of the machining center machining is performed serially on each bar stock, thus enhancing the productivity of the machining center.

17 Claims, 5 Drawing Sheets

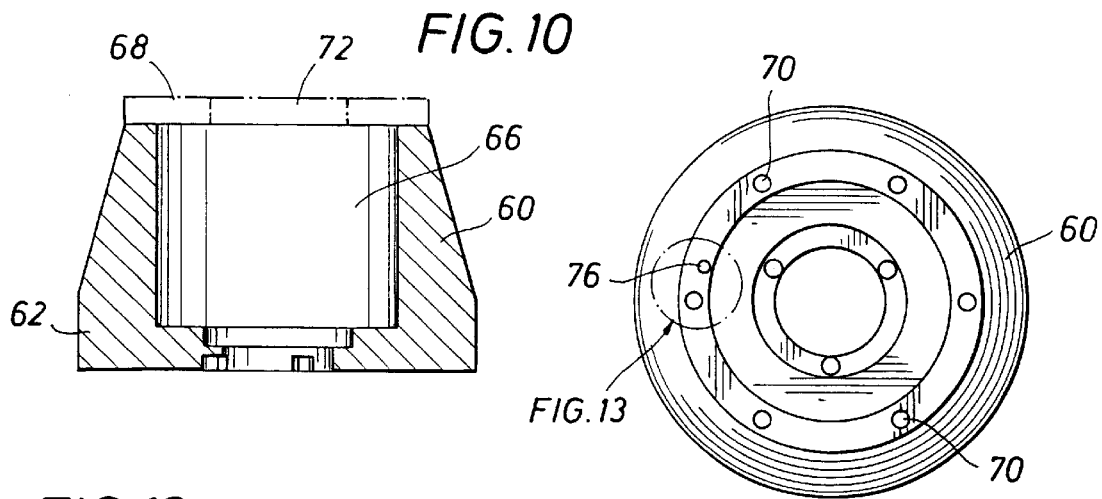
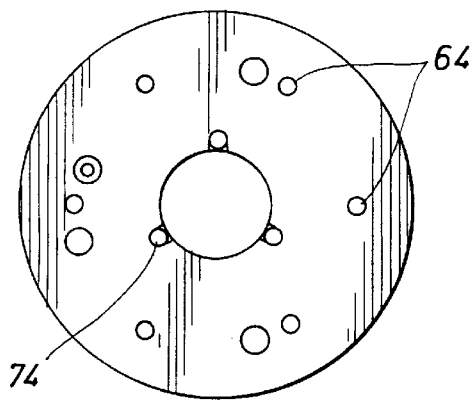
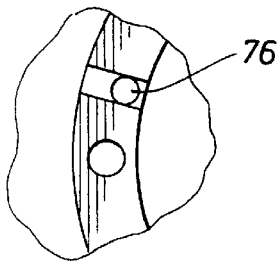
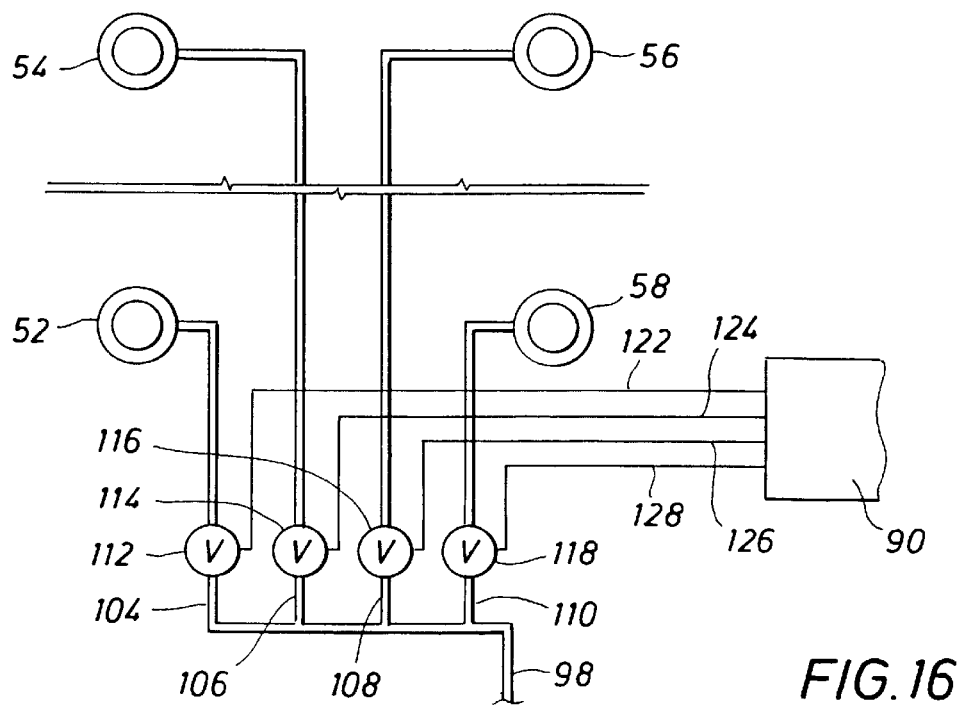

BAR FEEDER FOR MACHINING CENTER

CROSS REFERENCE TO PROVISIONAL APPLICATION

Applicant hereby claims priority from U.S. Provisional Application Serial No. 60/153,280 filed on Sep. 9, 1999 by Mark C. LaRue and entitled "Bar Feeder For Machining Centers", which Provisional Application is incorporated herein by reference for all purposes.

BACKGROUND OF THE INVENTION

1. Field of Invention

The present invention relates generally to an automatic feeder for feeding bars of raw material, i.e., bar stock to a machining tool. More particularly it relates to an automatic feeder for feeding bars to a machining center whether the bar stock is vertically oriented or horizontally oriented and for gripping and holding the bar stock during machining thereof. The present invention also provides for control interfacing of a bar stock feeding and holding mechanism with the control system of an automated machining center, such as a CNC machine either directly or by means of a sequencer system, to enable controlled actuation of the bar stock feeder and holding mechanism by the programmable control system of the machining center and to thus permit sequential machining of multiple parts from the multiple bar stock sections being supported for machining by the machining center.

2. Description of the Prior Art

When processing a plurality of raw material bars or bar stock with an automated programmable machining center, such as a CNC mill, a machine, operator in charge of the machining process must mount each of the sections of bar stock individually for processing by the machine. In many cases the machine operator must position each bar for machining after a preceding part has been completed and cut from the bar. This means that a machine operator must be attending the machine very regularly in order to machine a number of parts from a group of bars. Otherwise the mill or other machine will stand idle for significant periods of time and the bars will not be timely machined and the productive capacity of the machine will not be fully utilized. Many machined parts, require a number of different tool configurations. Since each part is individually machined from the bar stock, the number of tool changes required to make a chosen number of parts is the number of chosen parts times the number of different tooling configurations. All of the tooling changes can greatly increase the amount of time required to make the requisite parts.

Therefore, there is a need to provide an automatic bar feeder for feeding bar stock to a machining center and for supporting the bar stock during machining activity so that a user only has to set up the system and the feeder will continue to process a plurality of bars until the bar of raw material has been exhausted. Optimally, the system can also be set to process the bars as a group, performing each step on all of the bars present prior to changing the tooling, thereby significantly decreasing the machining time necessary. When the machines are CNC machines, set for milling operations, it is desirable that the bar stock be supported in vertically oriented fashion and movable by the computer controlled bed or work support table of the machine. It is also desirable that a milling head having multiple tools thereon be indexed to machining position for machining of parts from the bar stock. Unfortunately, to the detriment of CNC milling operations, the presence of a work supporting and positioning table beneath the machine support and positioning turret required the bar stock to be relatively short as compared to bar stock utilized in horizontal lathe type machines. This requirement typically causes a machine operator to make frequent bar stock changes, thus causing the productivity of the machine to accommodate the operator time that results from these frequent bar stock changes. Thus, it is desirable to minimize the operator time that is normally involved to install new bar stock at the end of a part machining cycle and thus enhance the productivity of the machine.

SUMMARY OF THE INVENTION

In keeping with the foregoing discussion, the objective of the present invention is to provide a bar feeder system having multiple work positioning stations for automatically feeding bars to a machining center. The bar feeder system of the present invention provides a plurality of mechanized chuck mechanisms for simultaneously holding a plurality of bars, four bars in the example shown, of raw material. Though the bar feeder system is designed for and discussed herein as having four work feeding and supporting chuck devices, such is not intended to be considered limiting of the spirit and scope of the present invention. The bar feeder system may more than four or less than four work supporting chuck mechanisms if desired. For positioning of the bar stock for machining, a spring loaded lifter mechanism is mounted to the machine turret and, when positioned above and in registry with the bar stock, is operated along the Z axis to grasp the upper end of a selected bar and to raise it as the bar is released by its chuck, after which the bar is again gripped by the chuck mechanism for that particular bar. As the positioned bars are machined, the mill completes each step of the machining process serially on each chuck supported bar prior to switching tooling to perform the next part machining step, thereby minimizing the time for the tool positioning sequences of the tool support and positioning turret of the machine and significantly decreasing the time necessary to complete a plurality of parts.

In keeping with the above discussion, the present invention takes the form of a machining center controlled bar feeding and holding mechanism having a base plate, which is mounted to the machine table. Attached to the base plate is a pedestal having a bar feeder top plate attached thereto. A plurality of clamping units, each being in the form of a mechanized collet chuck such as a pneumatically actuated chuck, is mounted in each corner or at other selected locations on the top plate. Each clamping unit is configured to hold a bar of raw material during machining thereof and to release the bar stock to permit its movement to a selected position relative to its chuck or to permit its replacement by fresh bar stock. Other objects and advantages of the invention will no doubt occur to those skilled in the art upon reading and understanding the following detailed description along with the accompanying drawings.

The bar feeder of the present invention is designed to allow automatic bar feeding and machining in vertical machining centers (VMCs) and horizontal machining centers (HMCs). The bar feeder may be used with machining centers in which the table rotates or is translated along X and Y move axes to position the work for machining and where the milling head either moves or is indexed to position selected machining tools for machining of the bar. The system could even be designed to rotate on the table top. A quick connect or other style connection or umbilical cable is used to connect control cables between the control of the machining center to the bar feeder to thus permit control of the chuck mechanisms of the bar feeder by the programmable control of the machining center. As necessary or desirable, an electronically controlled sequencer unit having electrical controls and electrically controlled pneumatic valves is controlled by the machining center to provide for selective actuation of the bar stock clamping mechanisms The bar feeder has a pedestal mounted on a base plate that can be bolted to a machine's table. The pedestal has an upper pedestal plate, to which is attached a bar feeder top plate to the pedestal. The bar feeder top plate has clamping units at each of the four corners. Collets in each clamping unit allow bar stock to be loaded, four bars at a time, one bar in each corner. The air-operated collet closers are independently controlled by the machine's programmed M functions. Currently, electro-pneumatic 5C collet closers are used, which are capable of receiving and supporting bar stock up to one inch in diameter, however, any other suitable collet or clamp may also be used for feeding and support of bar stock of lesser or greater dimension. The collets of the chuck mechanisms may be changed out as desired for adapting the clamping assemblies for differing sizes of bar stock.

On a typical vertical machining center, bars that are 12 inches long can be accommodated, depending on the height of the Z axis. Larger machines will allow longer bars to be loaded (A Hass VF3 vertical machining center, for example, will accommodate bar stock up to 16 inches long). On a horizontal machine with a stationary table, bar stock having a length up to 12 feet can be loaded, as long as there is room for the bar stock to extend beyond the back of the machine. The present invention may be used in combination with any of these machines.

A machine spindle of the machining center loads a bar puller from the tool changer or rotates a tool support and actuation turret to position the bar puller above and in registry with the selected bar. The bar puller may then be moved in programmed X and Y travels to locate above the center of the collet. Using the Z-axis, the bar puller secures the bar and pulls it up to a programmed length above the collet. The other three bars are pulled up in turn. The bar puller is replaced with a cutting tool from the magazine of the tool changer, and operations using this tool are performed on all four bars. After all four bars have been processed through the first step, the tool changer prepares for the next machining step. Once again, all four bars are machined through the second step. The process continues sequentially until all of the machining steps have been completed and the part is ready to be removed from the bar of raw material. The last step on each part is to use a circular saw to cut off the part, by reducing spindle speed just before the saw crosses the center of the part, the part can be separated neatly and dropped off for retrieval. These steps are repeated sequentially until the last part is cut off from each bar. Then the operator removes the nubs and loads fresh bar stock.

FIGS. 3 and 4 are bottom and cross-sectional views of the generally rectangular bottom connection plate of the bar feeder. A plurality of slots, four in the example shown, are located around the perimeter of the bottom connection or mounting plate and may be used to adjustably attach the bar feeder to the machining table of the automated machining center. Located between the slots are two alignment or indexing holes which receive indexing pins for squaring or establishing precise positioning of the bar feeder on the machine table. A plurality of connection holes ring the central opening of the base plate as shown in FIG. 2. The connection holes align with the connection holes in the bottom surface of the pedestal, seen in FIG. 6. Two indexing pin receiving holes located to either side of the central opening of the base plate and are configured to mate precisely with indexing pins that extend downwardly from the pedestal.

FIGS. 4 and 5 are elevation and sectional views respectively of the pedestal and FIGS. 6 and 7 are bottom and plan views respectively, also showing the pedestal of the bar feeder, The pedestal is of hollow and generally conical configuration as is evident from FIGS. 4 and 5. A ring of connection holes located in the bottom surface of the pedestal, seen in FIG. 6 and are located to align with corresponding connection holes in the bottom connection plate shown in FIG. 2. Located on opposite sides of the bottom surface of the pedestal are indexing openings into which indexing pins are fitted. The indexing pins are sized and configured to mate with the pin receiving holes located in the base, plate, thereby establishing precision alignment of the pedestal and base. A plurality of holes located on a recessed portion of the bottom surface are for attaching a cover plate which fits into the recess and covers the lower opening of the pedestal. A pair of umbilical cable access holes extend through the sidewall of the pedestal. The larger, upper hole is sized to receive a control umbilical cable which extends from the control of the machining center or the sequencer unit into the cavity in the bar feeder. The control umbilical cable operates the mechanisms within the cavity. The smaller, lower umbilical access hole of the pedestal is sized to receive an air line which feeds pressurized air to a plurality of air valves for air controlled operation of the collets. A plurality of connecting holes in the top surface of the pedestal are configured to mate with holes in the upper pedestal plate, seen in FIG. 9. A pair of indexing pin holes are located on the top surface of the pedestal and receive indexing pins which are sized and configured to mate with the pin receiving holes in the upper pedestal plate.

FIG. 9 is a top or plan view of the upper pedestal plate of the pedestal of the bar feeder, showing a plurality of arcuate indentations are cut from the perimeter of the upper pedestal plate. These arcuate indentations are sized and configured for alignment with circular cut-outs in the bar feeder top plate. These indentations are configured to receive the vertically oriented bars of raw material. A plurality of connection holes adjacent the perimeter of the upper plate are configured to align with matching connection holes in the top plate. The plurality of holes adjacent the outer ring of holes are aligned with the holes in the top plate to which the clamping units are attached. An inner ring of holes is formed of smaller and larger openings. The four smaller openings are configured to align with the four connecting holes in the top plate. The larger holes are for sized to receive air hoses entering the pedestal.

FIG. 1 is a perspective view of the pedestal with the upper plate located thereon. The pedestal and upper plate are mounted on the base plate though the upper pedestal plate is not visible in FIG. 1.

FIG. 8 is a bottom of the top plate of the bar feeder, showing its relationship with the pedestal top plate of FIG. 9. The pedestal top plate is mounted to the pedestal by mounting bolts extending through a plurality of connecting holes. One set of connecting holes forms a ring about the central portion of the bar feeder top plate and mates with the holes, located around the perimeter of the upper plate of the pedestal. An additional four connecting holes are oriented to form a square, shown in FIG. 8, that is centered within the outer ring of connecting holes. Located near each of the four corners are rings of connection holes which receive mounting bolts for connecting each of the clamping units to the upper surface of the bar feeder top plate. The clamping unit connection holes form a circular array around circular bar stock cut-outs or openings which are sized to receive the vertically oriented bars of raw material. Located near the circular array of clamping unit connection holes are two small air inlet holes for providing air to the collets of the clamping units.

FIGS. 10–13 are top, bottom, cross-sectional and detail views of the clamping unit chuck. The chuck assembly includes a housing of hollow and generally conical configuration. A plurality of holes extending longitudinally through the sidewalls of the chuck receive connection bolts for connection of the chuck to the bar feeder top plate. The detail drawing of FIG. 13 shows a close-up of an air inlet notch for admitting compressed air from an air supply shown in the schematic illustration of FIG. 14 which connects with each air chuck mechanism via air control valves which are actuated by a sequencer system responsive to control signals of the control system of the machining center. Located adjacent the central opening of the chuck is a ring of three cylinder guide mounting holes. The chuck is sized to receive any one of a plurality of collet sizes.

The parts of the present invention are preferably made of anodized aluminum, but other metals, plastics, etc. may be used is preferred, The parts are connected using any standard attachment means such as screws, bolts, etc.

The system offers more than increased productivity for machining centers, it allows many workpieces to be processed on a mill in less time than on a lathe. Higher spindle speeds are generally available on a mill and fewer tool changes are required when milling. For example, a typical 10-hp VMC offers spindle speeds starting at 7,500 rpm compared to 4,000 rpm for lathes with a 1-inch bar capacity. Whereas a lathe processes one part at a time, repeating all tool changes for each part, a machining center with the present invention changes tools only after it has performed operations on all four parts, thereby saving time. For example, in one instance the present invention could make four parts in three minutes on a mill, whereas made on a lathe a single part could take six minutes.

Parts requiring live tooling on a turning center may also benefit from using a mill with the present invention. Live tooling on a lathe may provide only limited speeds and feeds compared to those provided by a machining center's main spindle. Circular interpolation on the machining center allows holes and threads to be milled easily. Likewise, operations performed off center are obviously no problem on the mill. In some cases, operations that produced tangles of stringy chips on a lathe created no such problems when milled instead.

Small, intricate parts, such as for the medical and aerospace fields, are especially well-suited for the present invention. Aluminum parts normally run in turning centers can be machined faster in mills due to higher rpms and 75% fewer tool changes. And, when not bar feeding, the present invention provides a pallet of collet closers that can be used for other work such as for robotic loader and unloader operations.

The size of the present invention may be increased or decreased depending on the needs of the user and the size of the machining center.

Many features have been listed with particular configurations, options, and embodiments. Any one or more of the features described may be added to or combined with any of the other embodiments or other standard devices to create alternate combinations and embodiments.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a top perspective view of a bar feeder mechanism embodying the principles of the present invention;

FIG. 2 is a plan view showing the bottom plate of the bar feeder mechanism;

FIG. 3 is a sectional view taken along line 3—3 of FIG. 2 and showing further details of the bottom plate of the bar feeder;

FIG. 4 is an elevation view showing the pedestal structure of the bar feeder;

FIG. 5 is a sectional view taken through the pedestal of FIG. 3 and showing further details of the pedestal;

FIG. 6 is a bottom view of the pedestal of FIG. 5 with the closure plate removed and showing the bottom surface and the interior of the pedestal;

FIG. 7 is a plan view of the pedestal of FIG. 5, showing the upper planar surface and outer tapered surface thereof;

FIG. 8 is a bottom view showing the top plate of the bar feeder and showing holes therein for mounting thereof to the pedestal of FIGS. 4 and 5 and for mounting of work support chucks thereto;

FIG. 9 is a plan view of the pedestal top plate showing multiple holes therein for mounting thereof to the pedestal, for mounting of the top plate thereto and for mounting of clamping units thereto;

FIG. 10 is a sectional view showing the outer housing of a work support chuck;

FIG. 11 is a plan view of one of the clamping units of the bar feeder;

Figure 14:
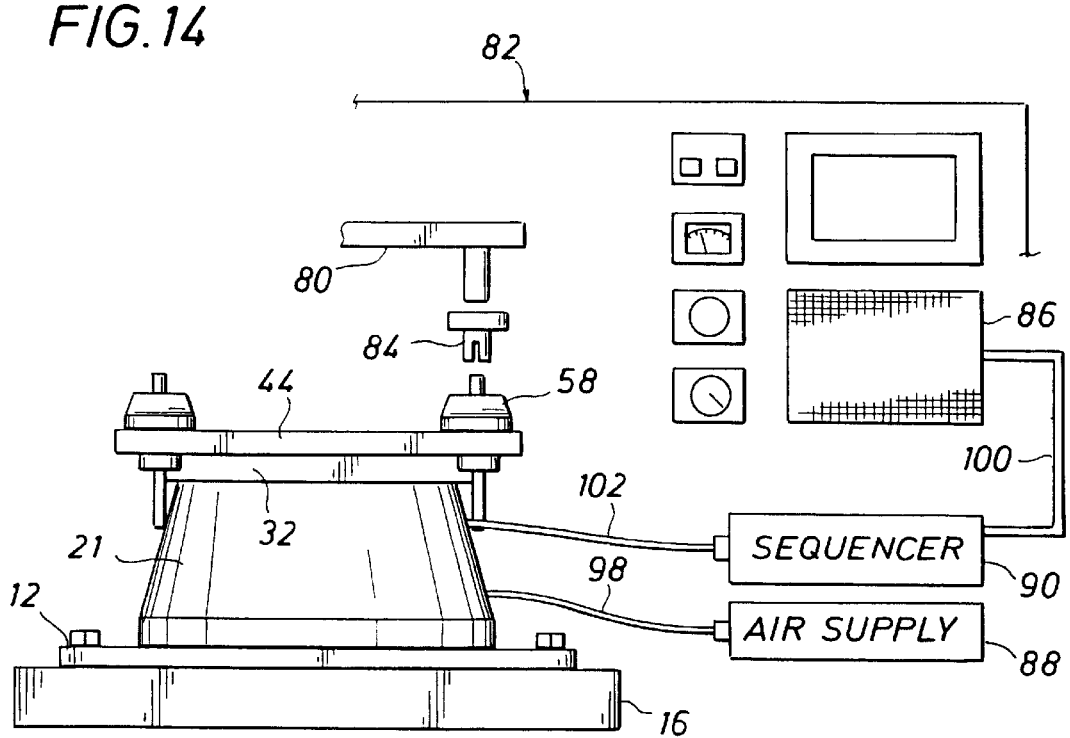
Figure 15:
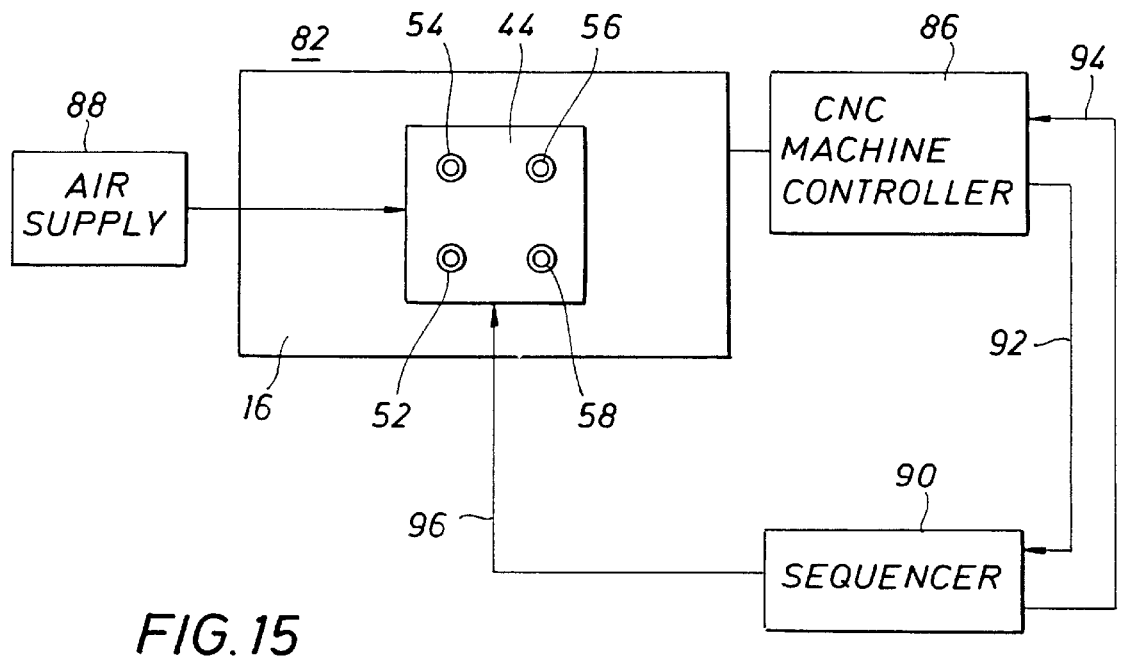

FIG. 12 is a bottom view of one of the clamping units of the bar feeder;

FIG. 13 is a fragmentary sectional view of the clamping unit of FIG. 11, showing the air inlet port thereof;

FIG. 14 is a schematic illustration showing a sequencer unit interfacing with the control system of the machining center and with the bar feeder and support mechanism to permit control of the bar feeder and support mechanism by movement functions of the control system;

FIG. 15 is a partial schematic illustration showing a bar feeder mechanism according to the present invention being operatively mounted within an automated machining center and further showing air supply and electrical control connections with the machining center controller; and FIG. 16 is a schematic illustration showing solenoid valve controlled operation of the air supply for the air chucks of the bar feeder mechanism of the present invention and selective control of the solenoid valves by the controller of the automated machining center.

DETAILED DESCRIPTION OF THE INVENTION

Figure 1:
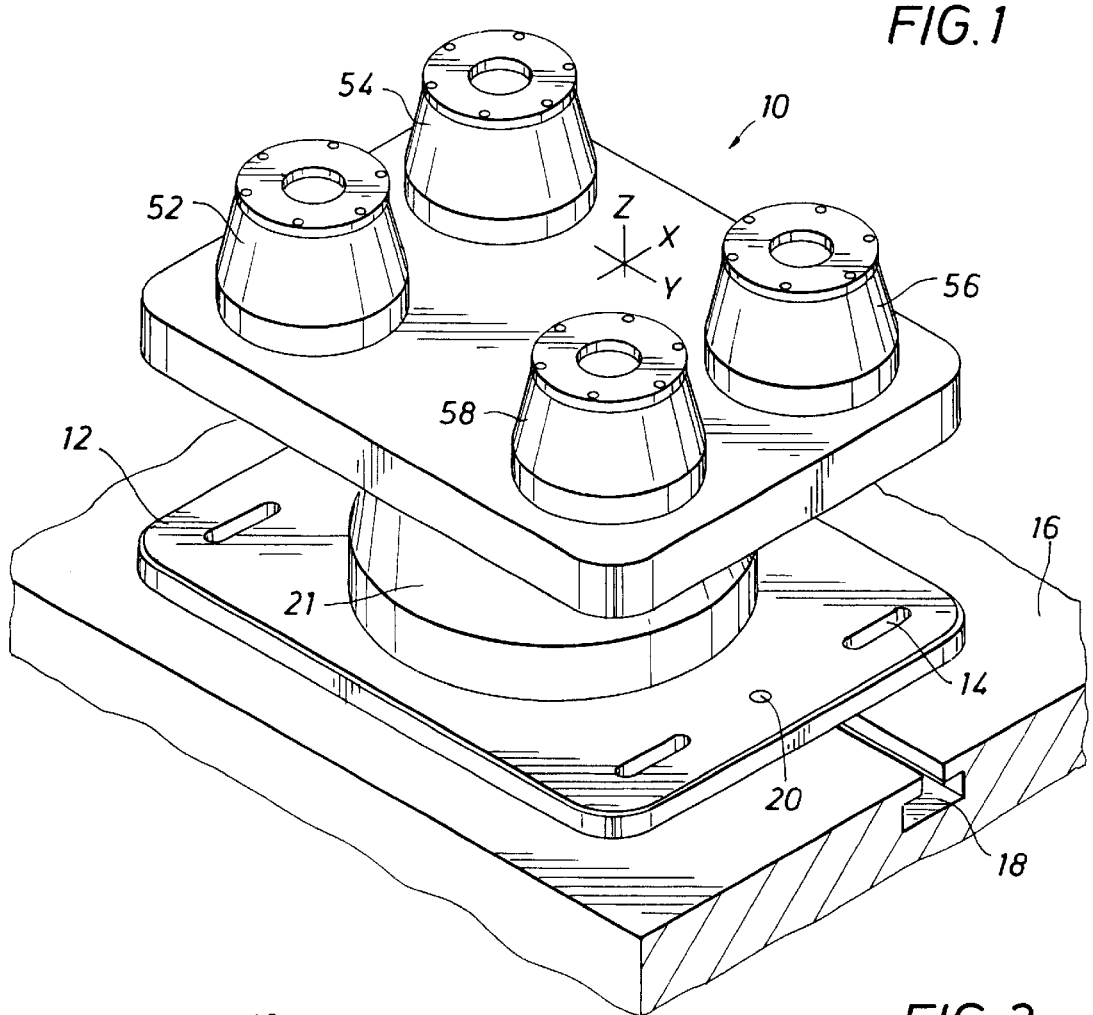
Figure 2:
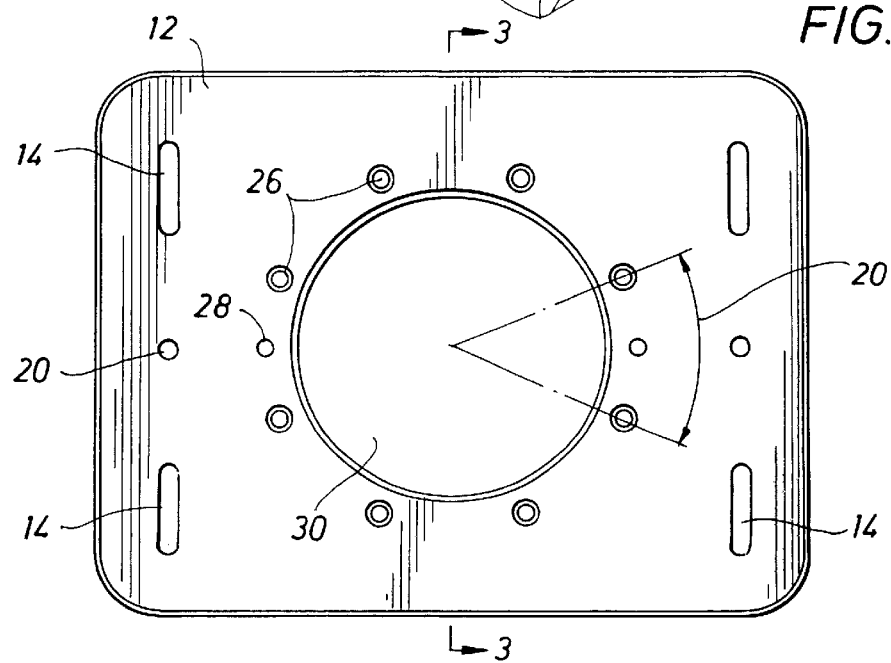
Figure 3:
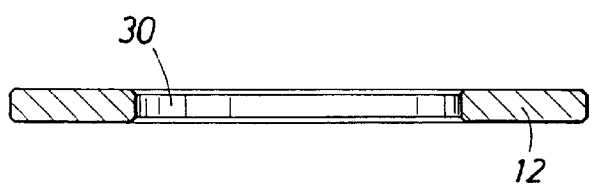
Figure 4:
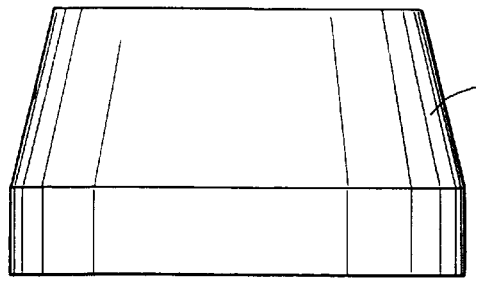
Figure 5:
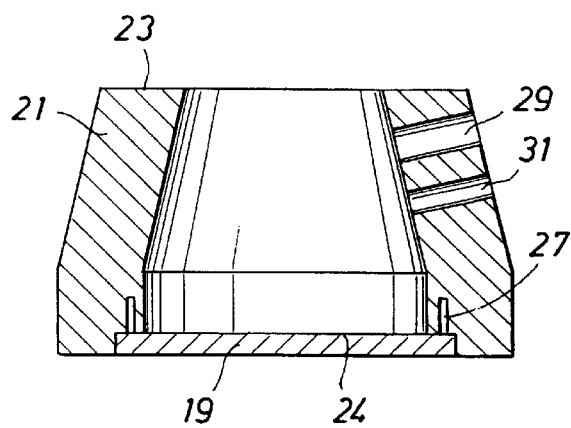
Figure 6:
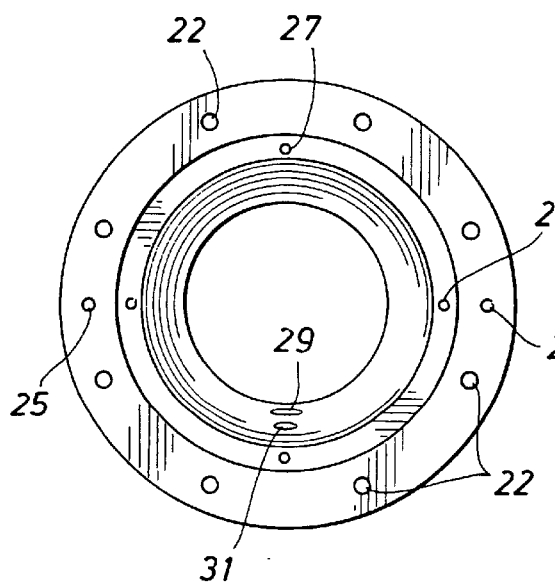
Figure 7:
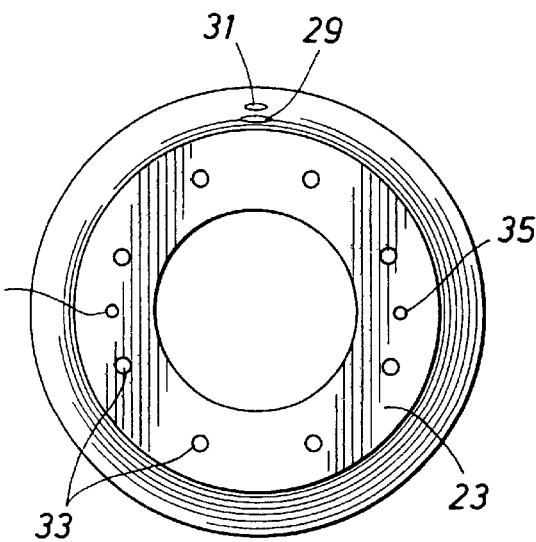

Referring now to the drawings and first to FIG. 1, a bar feeder mechanism embodying the principles of the present invention is shown generally at 10 in the top perspective view and is in the form of a work positioning structure for mounting to the work positioning table of a machining center. The work supporting structure incorporates a bottom mounting plate 12 defining a plurality of connection slots 14 which receive connection bolts for mounting of the bottom plate in fixed relation with the movable work support and positioning table 16 of an automated conventional, i.e., CNC machine. The movable work support and positioning table 16 typically defines a plurality of undercut slots, one of which is shown at 18 which receive threaded nut devices corresponding to the configuration of the connection slots. The bottom plate 12 also defines a plurality of indexing holes 20 through which indexing pins are extended for precision indexing of the bar feeder mechanism with respect to corresponding indexing holes in the moveable work support and positioning table of the CNC machine. To the bottom plate 12 is fixed a pedestal member 21 having a bottom section defining threaded connection openings 22 that register with corresponding connection bolt openings 26 of the bottom plate 12. The bottom section of the pedestal 21 defines at least two pedestal indexing or alignment openings 25, shown in FIG. 6, having indexing pins which are also received by pedestal indexing openings 28 of the bottom plate 12 for precisely aligning the pedestal 21 with respect to the bottom plate 12. The pedestal 21 further defines a bottom recess 24 which receives a closure plate 19 which is retained by bolts received by internally threaded openings 27. The pedestal 21 also defines umbilical passages 29 and 31 through which bar stock chuck actuating umbilical cable and air supply tube extend.

The bottom plate 12 also defines a central opening 30 to minimize the overall weight of the pedestal mechanism so that it can be manually lifted and installed onto the work support and positioning table of a CNC machine. Since the bar stock feeder is indexed with respect to the work support and positioning table by indexing pins, the installation process for the bar stock feeder mechanism is simple and takes only from 10 to 15 minutes time even by inexperienced personnel, without risk of improperly positioning the bar feeder mechanism.

Figure 8:
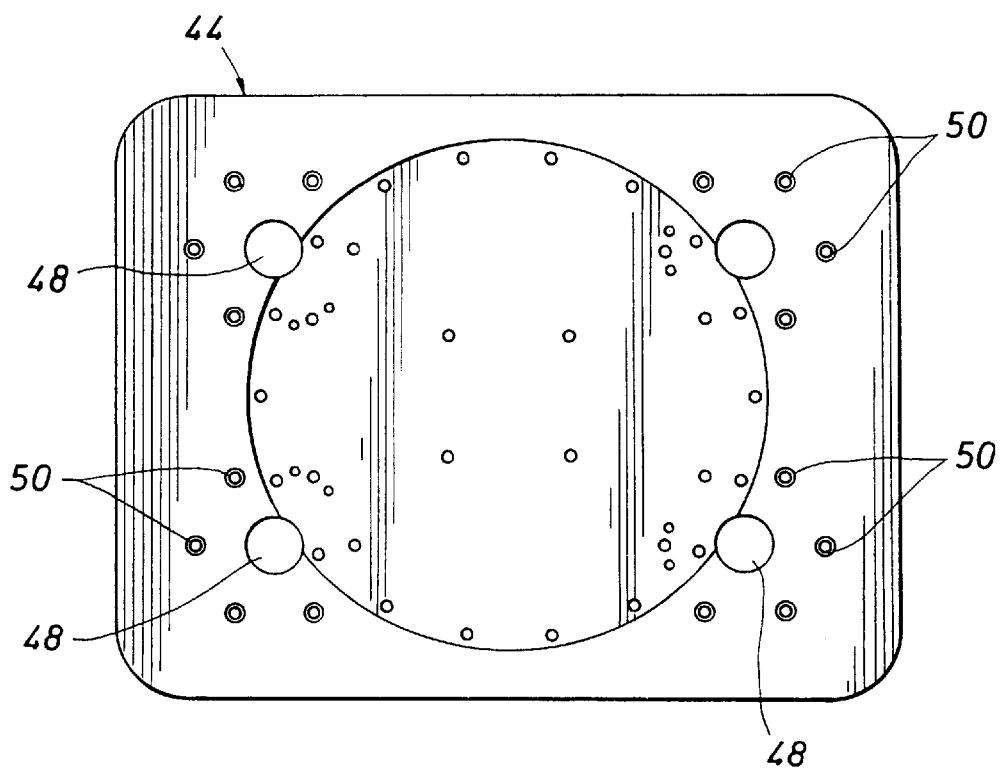
Figure 9:
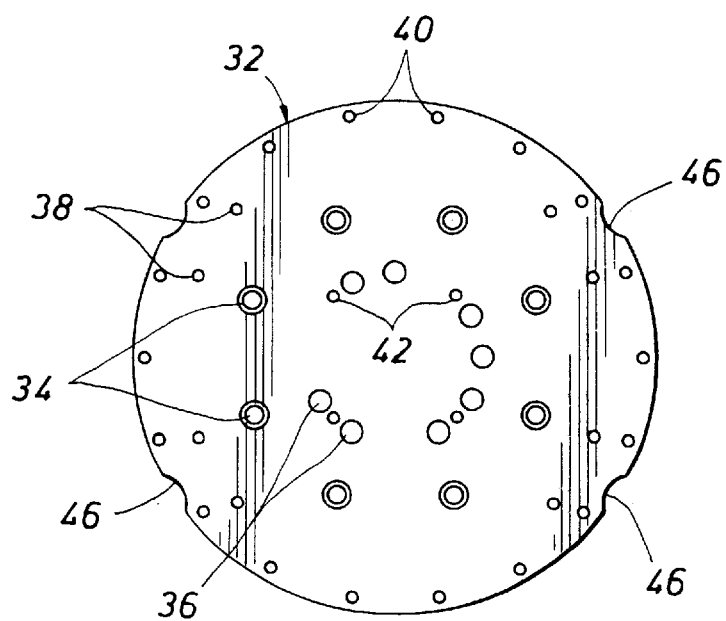

To the planar upper end surface 23 of the pedestal 21 is provided an upper pedestal plate which is shown generally at 32 in the plan view of FIG. 9 and which defines a plurality of pedestal connection holes 34. The connection holes 34 of the upper pedestal plate 32 receive a plurality of connection bolts by which the upper pedestal plate is firmly mounted to the pedestal. The connection bolts are received by threaded connection holes 33 that are arranged in evenly spaced circular array along the upper, generally planar upper surface 23 of the pedestal 21. The upper pedestal plate also defines a plurality of air hose openings through which air chuck hoses extend. A plurality of clamping unit attachment holes 38 are also defined by the upper pedestal plate to permit mounting of the four bar stock clamping units that are shown in FIG. 1 and FIGS. 10–13 and described in detail hereinbelow. Multiple upper pedestal plate connection holes 40 and interior top plate connection holes 42 are defined in the upper pedestal plate 32. At least two indexing holes 35 are also present in the upper part of the pedestal and receive indexing pins which are also received in corresponding indexing holes of the top plate 32, thus precisely orienting the pedestal top plate with respect to the pedestal The interior top plate connection holes 40 permit multiple small connection bolts to be utilized for fixing a bar feeder top plate, shown generally at 44 in FIG. 8, in immovable relation with the upper pedestal plate 32. The outer periphery of the upper pedestal plate 32 defines four arcuate indentations 46 which establish registry with four bar stock openings 48 that are defined in the bar feeder top plate 44. The bar stock openings 48 establish the maximum diameter of vertically oriented bar stock that may be utilized by the automated machining apparatus, i.e., vertical machining center, for the production of parts.

About each of the bar stock openings 48 there is provided a plurality of connection holes 50 which receive connection bolts by which a plurality, in the preferred embodiment shown in the drawings, four bar stock feeding and gripping units shown at 52, 54, 56 and 58 in FIG. 1 are mounted. It should be borne in mind, however, that any desired number of bar stock feeding and gripping units may be utilized within the spirit and scope of the present invention.

Each of the bar stock feeding and gripping units is of the construction and function shown and described in connection with FIGS. 10–13 of the drawings and incorporates a chuck housing or cylinder guide 60 having a bottom section 62 having a plurality of threaded openings 64 permitting bolts extending through the bar feeder top plate 44 to secure the chuck housing 60 to the upper surface of the bar feeder top plate 44. The chuck housing 60 defines an internal chamber 66 and is partially closed by a an upper plate 68 that is mounted by bolts received by threaded bolt holes 70 such as shown in FIGS. 10 and 11. The upper chuck plate 68 defines a centrally located collet opening 72 through which the tubular section of a collet member is extended. As shown in the bottom view of FIG. 12, a plurality of cylinder guide mounting holes 74 are provided for securing a collet actuating cylinder within the internal chamber 66. A internally threaded collet assembly nut is typically utilized to secured a collet member of appropriate dimension for particular bar stock within the chuck housing. As shown in FIG. 11 and in the fragmentary sectional view of FIG. 13, an air inlet 76 is provided to admit pressurized air into the air chuck for air pressure controlled actuation of the gripping function of the collet with respect to a section of bar stock extending through the central opening of the collet. Pressurized air for air chuck actuation is delivered to each of the air chuck mechanisms via a flexible air supply conduit or hose which is supplied under the programmed movement function control of the automated machining apparatus with which the bar stock feeding and positioning apparatus of the present invention is associated. When pressurized air is being supplied, the air chuck mechanism will be energized for gripping the bar stock and when pressurized air is not being supplied, the spring characteristics of the bar gripping collet will open the collet sufficiently to release the bar stock.

As shown in FIG. 14, the machining turret 80 of a conventional automated machining center, shown generally at 82 is provided with a spring loaded bar puller assembly 84 which, with the bar stock firmly supported by a selected air chuck mechanism 58, will be moved downwardly, or along the Z axis by appropriate movement signals of the control system or controller 86 of the machining center and will engage and grip the upper end of the selected section of bar stock with sufficient gripping force to raise the bar stock. After the air chuck mechanism 58 has been deenergized by termination of the supply of pressurized air from the air supply 88, again by valve controlling signals of the controller 86, the bar puller will raise the bar stock to a programmed height for machining activity. The air chuck is then energized by an air valve controlling signal of the controller 86, causing it to grip the bar stock, after which the bar puller is moved upwardly by an movement function signal of the controller, causing the bar puller to be disengaged from the bar stock and move clear of the bar stock. Bar stock positioning activity is repeated serially so that the bar stock of each air chuck is positioned and securely supported for machining activity. The tool positioning turret 80 is then positioned for machining and machining activity for each subsequent machine tool is accomplished in serial fashion, with the last machining activity being separation of completed parts from the sections of bar stock.

Referring now to the schematic illustration of FIG. 15, the automated machining center 82 is controlled by M signals of the control system 86 to cause the work positioning table or platform 16 to be moved with X and Y axis moves to position a selected air chuck so that its bar stock is properly positioned for machining. A sequencer unit 90 is coupled with the controller 86 to receive an n desired movement command via conductor 92. The sequencer unit then verifies this movement command via conductor 94 and, upon verification of the command, the sequencer unit transmits a command via conductor 96 to a selected bar stock feeding and holding unit or air chuck, causing the selected air chuck to release the bar stock for movement and after such movement to again grip the bar stock for machining activity. The air supply conduit 98, extending from the air supply 86 of the machining center 82, continuously supplies compressed air to the air valves for each of the air chucks. Since these air supply control valves are normally open, the air chuck mechanisms are each normally closed so that the bar stock thereof is supported for machining activity. To permit raising of the bar stock at the beginning of each machining cycle, the air valve of a selected air chuck is deenergized by closing of the respective air valve. This causes the collet of the selected air chuck to relax from its gripping relation with the bar stock, thus releasing the bar stock for its upward or linear movement to its programmed machining position by the bar stock puller 84. The movement command control signals from the controller 86 to the sequencer unit 90 can be conducted via a small conductor or conductor bundle of a control cable 100, while a control conductor umbilical cable 102 is used to contain the various control conductors for operation of the air chuck mechanisms responsive to the controller signals. These conductors are each of the quick-disconnect type, thus permitting the bar feeder and support mechanism of the present invention to be easily and quickly installed or removed with respect to the automated machining center to adapt it for enhanced production.

As shown in the air supply and control schematic illustration of FIG. 16, the air supply conduit 98 serves as a manifold line, being connected with individual air chuck supply lines 104, 106, 108 and 110 which are connected in air supplying relation with solenoid type air valves 112, 114, 116 and 118 each having supply lines connected respectively to the air chuck mechanisms as shown. The solenoid valves are electrically controlled by signals of electrical control conductors 120, 122, 124 and 126 of the sequencer unit for selectively controlling energization and de-energization of the air control valves and thus controlling the supply of pressurized air to the respective air chucks for operation thereof. The air control valves are normally open when de-energized so that all air chucks will be positioned for gripping of the bar stock thereof during machining activities. An air valve selected by the sequencer responsive to the controller to the automated machining center will be energized and thus moved to its closed position for causing opening of an air chuck mechanism to release the bar stock and permit it to be raised or moved linearly to a programmed machining position. If desired, the air valves can be arranged to cause the air chucks to grip the bar stock when the air valves are energized and permit controller de-energization of selected air valves for opening or releasing of a selected air chuck.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for sequential machining of parts from a plurality of sections of bar stock, comprising:

onto a moveable work support table of an automated machining center having an electronic machining control system and having a bar stock puller, mounting a bar stock feeder and support mechanism having a plurality of mechanized bar stock supporting chuck devices thereon each having electronically controlled connection with said electronic machining control system of said automated machining center for selective independent control thereof;

positioning sections of bar stock in each of said mechanized bar stock supporting chuck devices;

under control of said electronic machining control center serially positioning each of said sections of bar stock at programmed machining positions by moving said bar stock puller into gripping relation with a section of bar stock being supported by a designated bar stock supporting chuck device, releasing said designated bar stock supporting chuck device and moving the section of bar stock to a programmed machining position and again closing said designated bar stock supporting chuck device for holding said bar stock at said programmed machining position;

under control of said machining control center, repeating said serially positioning step for positioning each of said sections of bar stock at programmed machining positions thereof;

locating a machining tool for machining of a part from said bar stock and performing at least one machining operation serially on each section of bar stock;

repeating said locating a machining tool for machining of a part from said bar stock and performing a machining operation serially on each section of bar stock with a plurality of differing machining tools and performing each machining operation serially on each of said sections of bar stock until completed parts have been machined and separated from said sections of bar stock; and repeating all above method steps until said sections of bar stock have been depleted.

2. The method of claim 1, wherein said plurality of mechanized bar stock supporting chuck devices are each pneumatically actuated by compressed air from an air supply and being controlled by electrically actuated valves each being electrically controlled by said control system of said automated machining center, said method comprising:

electrically energizing selected electrically actuated valves for open positioning thereof for communication of compressed air to respective bar stock supporting chuck devices to close said chuck devices and support the bar stock for machining; and to permit bar puller movement of a selected section of bar stock to said programmed machining position, electrically deenergizing a selected air valve associated with a bar stock supporting chuck device thereof for opening the respective bar stock supporting chuck device and releasing the bar stock to permit puller actuated movement thereof to a programmed machining position; and when said bar stock has been positioned at said programmed machining position by said bar puller, again energizing said selected air valve for closing the associated a bar stock supporting chuck device and supporting the bar stock at said programmed machining position for machining thereof.

3. The method of claim 2, wherein a sequencer unit is controllably connected with said control system of said automated machining center and has electrical and air supply connections with said electrically actuated valves, said method comprising:

responsive to electrical control by said control system of said automated machining center selectively actuating said electrically actuated valves by control of said sequencer unit for causing opening of a selected bar stock supporting chuck device to permit puller actuated positioning of the bar stock thereof at said programmed machining position and for causing selective closing of selected bar stock supporting chuck devices for supporting the bar stock thereof at said programmed machining positions thereof.

4. A bar stock feeder and support mechanism for an automated machining center having an electronic control system, comprising:

a work positioning structure being removable mounting to a work support and positioning table of an automated machining center and having a bar feeder top plate;

a plurality of mechanized machine controlled bar stock chuck mechanisms each being mounted to said bar feeder top plate and having a bar stock gripping collet being controllably closed and opened responsive to electronic control signals of said automated machining center for selectively gripping the bar stock during machining thereof and selectively releasing the bar stock to permit raising and replacement of the bar stock;

a bar stock puller mechanism being positioned by said automated machining center and being operative responsive to electronic control signals of said electronic control system for gripping and raising the bar stock to a programmed height after release of the bar stock and for releasing from the bar stock at said programmed height;

a plurality of control conductors being connected with said electronic control system of said automated machining center, each of said control conductors having controlling connection with each of said plurality of mechanized machine controlled bar stock chuck mechanisms and being serially controlled by said electronic control system for serial operation of said plurality of mechanized machine controlled bar stock chuck mechanisms by said control system of said automated machining center; and said electronic control system controlling said automated machining sencer to perform each machining operation serially on the bar stock being supported by said plurality of mechanized machine controlled bar stock chuck mechanisms until completed parts are parted serially from said bar stock.

5. The bar stock feeder and support mechanism of claim 4, comprising:

said plurality of control conductors being located within a control umbilical cable.

6. The bar stock feeder and support mechanism of claim 4, comprising:

said bar feeder top plate having a plurality of bar stock feed openings therein; and said plurality of mechanized machine controlled bar stock chuck mechanisms each being mounted in substantially concentric relation with respective bar stock feed openings and having pneumatically energized collet clamp members positioned to receive bar stock extending through said respective bar stock feed openings.

7. The bar stock feeder and support mechanism of claim 4, wherein said work positioning structure comprising:

a bottom plate adapted for indexed releasable assembly to a work support and positioning table of an automated machining center;

a hollow pedestal being connected to and projecting upwardly from said bottom plate and defining an upper pedestal end;

an upper pedestal plate being fixed to said upper pedestal end;

said bar feeder top plate being fixed to said upper pedestal plate and defining a plurality of bar stock openings; and said plurality of mechanized machine controlled bar stock chuck mechanisms each being mounted to said bar feeder top plate.

8. The bar stock feeder and support mechanism of claim 4, wherein said bar stock puller mechanism comprising:

a bar stock puller element capable of releasably gripping the upper end of a selected section of bar stock; and a puller control mechanism controlled by said control system of said automated machining center for selectively moving said bar stock puller element linearly for moving a selected bar stock section to said programmed machining position thereof and after closing of said bar stock chuck mechanism therefor moving said bar stock puller element further linearly for separating said bar stock puller element from the selected section of bar stock said puller control system causing each movement of said bar stock puller to occur serially for each of said plurality of mechanized machine controlled bar stock chuck mechanisms so that each section of bar stock is positioned for machining before machining is initiated and each part being machined is finished serially.

9. The bar stock feeder and support mechanism of claim 8, wherein said bar stock puller comprises:

a generally tubular member being supported by the machining turret of said automated machining center and being movable along a Z axis for gripping engagement with a section of bar stock being gripped by a selected mechanized machine controlled chuck mechanism and for moving the bar stock linearly along the Z axis when the selected mechanized machine controlled chuck mechanism is de-energized for releasing the bar stock and for pulling away from the bar stock when the selected mechanized machine controlled chuck mechanism is again energized for gripping the bar stock.

10. The bar stock feeder and support mechanism of claim 4, comprising:
an air supply of said automated machining center being connected with said bar stock feeder and support mechanism and supplying pressurized air for operation of said plurality of mechanized machine controlled bar stock chuck mechanisms;
a plurality of air control valves, being connected one for each of said mechanized machine controlled bar stock chuck mechanisms, said plurality of air control valves being electronically operated and being selectively controlled by electronic control signals said electronic control system of said automated machining center for thus selectively controlling opening and closing of said mechanized machine controlled bar stock chuck mechanisms in series and in cooperative relation with movements of said bar stock puller by said electronic control system.

11. The bar stock feeder and support mechanism of claim 4, comprising:
a sequencer unit having controlled signal responsive connection with the control system of the automated machining center and having controlling connection with each of said plurality of mechanized machine controlled bar stock chuck mechanisms for selective and serial actuation thereof to bar stock gripping and releasing positions responsive to electronic signals of said electronic control system.

12. A bar stock feeder and support mechanism for an automated machining center having an electronic control system, comprising:
a bottom plate having position indexed releasable assembly to a work support and positioning table of an automated machining center;
a hollow pedestal being connected to and projecting upwardly from said bottom plate and defining an upper pedestal end;
an upper pedestal plate being fixed to said upper pedestal end and being position indexed with respect to said hollow pedestal and said bottom plate;
a bar feeder top plate being fixed to said upper pedestal plate in position indexed relation with said upper pedestal plate and defining a plurality of bar stock openings;
a plurality of mechanized machine controlled bar stock chuck mechanisms each being mounted to said bar feeder top plate in registry with respective bar stock openings and having a bar stock gripping collet being controllably closed and opened responsive to electronic control signals of said automated machining center for selectively gripping the bar stock during machining thereof and selectively releasing the bar stock to permit raising and replacement of the bar stock;
a bar stock puller mechanism being positioned by said automated machining center and being operative responsive to electronic control signals of said electronic control system for gripping the bar stock during gripping of the bar stock by said bar stock gripping collet and raising the bar stock to a programmed height after release of the bar stock and for moving upwardly during gripping of the bar stock by the collet for releasing from the bar stock; and
said electronic control system controlling said automated machining sencer to perform each machining operation serially on the bar stock being supported by said plurality of mechanized machine controlled bar stock chuck mechanisms until completed parts are parted serially from said bar stock.

13. The bar stock feeder and support mechanism of claim 12, comprising:
a sequencer unit having controlled signal responsive connection with the control system of the automated machining center and having controlling connection with each of said plurality of mechanized machine controlled bar stock chuck mechanisms for selective and serial actuation thereof to bar stock gripping and releasing positions responsive to electronic control signals of said electronic control system.

14. The bar stock feeder and support mechanism of claim 12, comprising:
said bar feeder top plate having a plurality of bar stock feed openings therein; and
said plurality of mechanized machine controlled bar stock chuck mechanisms each being mounted in substantially concentric relation with respective bar stock feed openings and having pneumatically energized collet clamp members positioned to receive bar stock extending through said respective bar stock feed openings.

15. The bar stock feeder and support mechanism of claim 12, wherein said bar puller comprising:
a generally tubular member being supported by the machining turret of said automated machining center and being movable along a Z axis for gripping engagement with a section of bar stock being gripped by a selected mechanized machine controlled chuck mechanism and for moving the bar stock linearly along the Z axis when the selected mechanized machine controlled chuck mechanism is de-energized for releasing the bar stock and for pulling away from the bar stock when the selected mechanized machine controlled chuck mechanism is again energized for gripping the bar stock.

16. The bar stock feeder -and support mechanism of claim 12, wherein the automated machining center incorporates an electronic controller, said bar stock feeder and support mechanism comprising:
an air supply;
a plurality of electrically operated air valves each being connected to receive pressurized air from said air supply and each having air supplying connection with respective ones of said mechanized machined controlled bar stock chuck mechanisms; and
an electronic sequencer unit having controlling connection with each of said electrically operated air valves and having controlled connection with the controller of the automated machining center for serially controlled actuation of said electrically operated air valves causing serial operation of said plurality of mechanized machine controlled bar stock chuck mechanisms.

17. The bar stock feeder and support mechanism of claim 12, comprising:
an air supply of said automated machining center being connected with said bar stock feeder and support mechanism and supplying pressurized air for operation of said plurality of mechanized machine controlled bar stock chuck mechanisms; and a plurality of air control valves, being connected one for each of said mechanized machine controlled bar stock chuck mechanisms, said plurality of air control valves being selectively controlled by said control system of said automated machining center for serially controlled actuation of said electrically operated air valves causing serial operation of said plurality of mechanized machine controlled bar stock chuck mechanisms for thus selectively controlling serial opening and closing of said mechanized machine controlled bar stock chuck mechanisms.

* * * * *